(12) United States Patent
Szeliski et al.

(10) Patent No.: US 7,574,017 B2
(45) Date of Patent: Aug. 11, 2009

(54) STATISTICALLY COMPARING AND MATCHING PLURAL SETS OF DIGITAL DATA

(75) Inventors: Richard Szeliski, Bellevue, WA (US); Nicholas Wilt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 11/297,086

(22) Filed: Dec. 7, 2005

(65) Prior Publication Data

US 2006/0083405 A1  Apr. 20, 2006

Related U.S. Application Data

(63) Continuation of application No. 09/504,022, filed on Feb. 18, 2000, now Pat. No. 6,993,156.

(51) Int. Cl.
*G06K 9/00* (2006.01)

(52) U.S. Cl. .................. 382/103; 382/209; 382/228; 382/299; 348/169

(58) Field of Classification Search .................. 382/103, 382/209, 228, 299; 348/169
See application file for complete search history.

(56) References Cited

U.S. PATENT DOCUMENTS 4,736,437 A * 4/1988 Sacks et al. .................. 382/216
5,581,276 A * 12/1996 Cipolla et al. ................ 345/156

* cited by examiner

*Primary Examiner*—Wesley Tucker
(74) *Attorney, Agent, or Firm*—Lyon & Harr, LLP; Mark A. Watson

(57) ABSTRACT

The present invention is embodied in a system and method for statistically comparing a first set of digital data to at least a second set of digital data and matching the first set of digital data to appropriately corresponding portions of the second set of digital data. The first or the second set of digital data can be transformed during statistical analysis to enhance statistical analysis of the digital data.

8 Claims, 6 Drawing Sheets

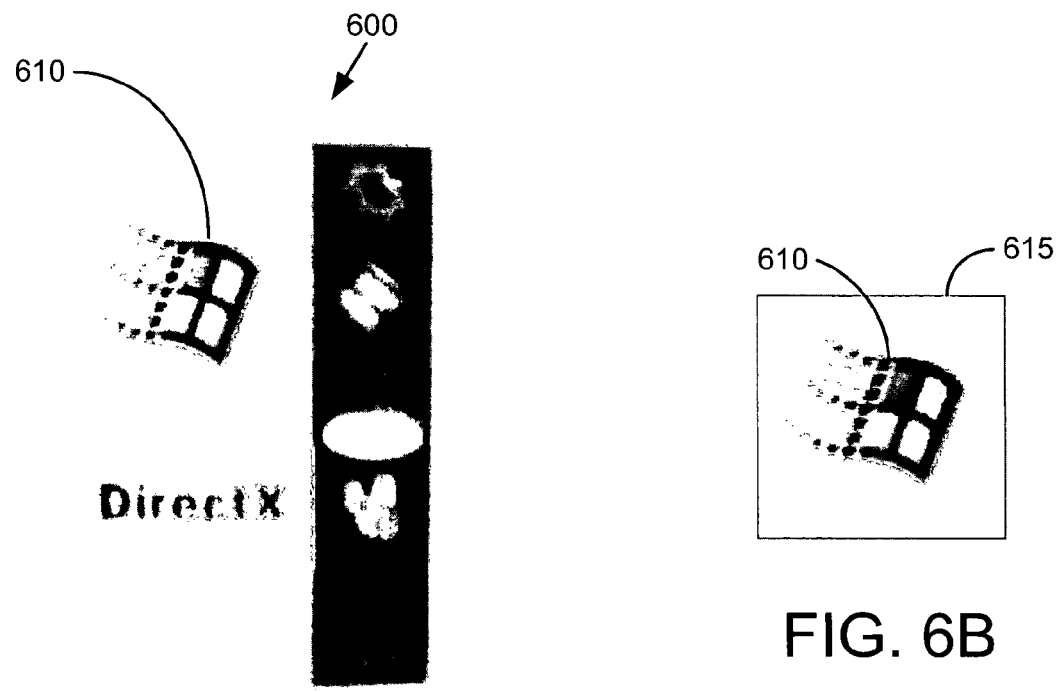
FIG. 6A
FIG. 6B
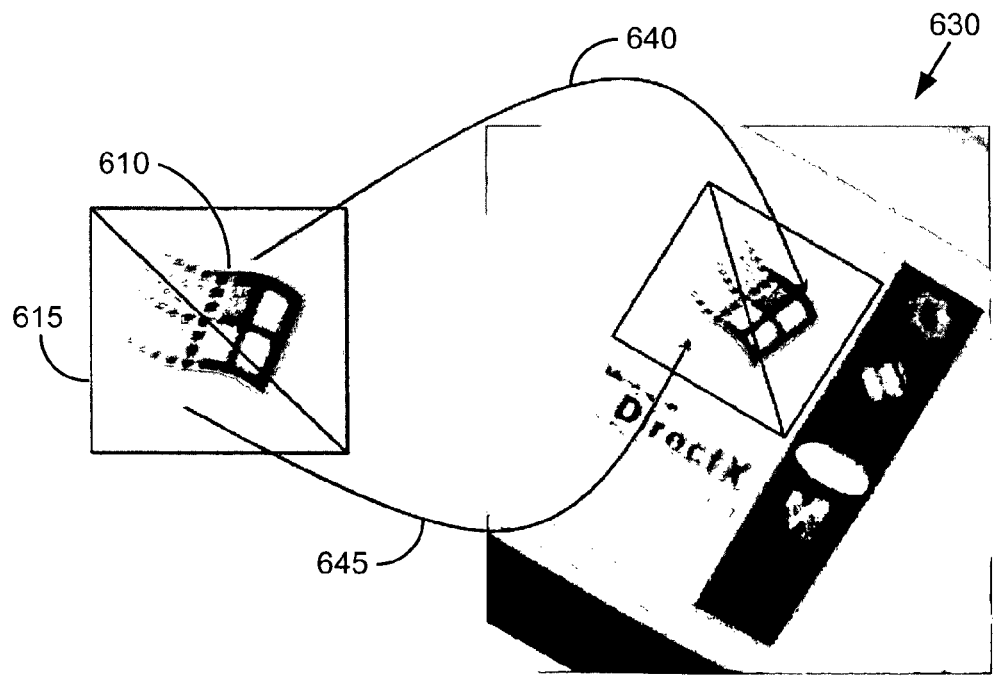
FIG. 6C

STATISTICALLY COMPARING AND MATCHING PLURAL SETS OF DIGITAL DATA

CROSS REFERENCE TO RELATED APPLICATIONS

This application is a Continuation Application of U.S. patent application Ser. No. 09/504,022, filed on Feb. 18, 2000 now U.S. Pat. No. 6,993,156 by SZELISKI, et al., and entitled "A SYSTEM AND METHOD FOR PERFORMING SPARSE TRANSFORMED TEMPLATE MATCHING USING 3D RASTERIZATION".

BACKGROUND OF THE INVENTION

1. Field of the Invention

The present invention relates in general to object detection and tracking, and in particular to a system and method for statistically comparing and matching plural sets of digital data.

2. Related Art

Applications for automatic digital object detection and tracking, image registration, pattern recognition and computer vision analysis are becoming increasingly important for providing new classes of services to users based on assessments of the object's presence, position, trajectory, etc. These assessments allow advanced and accurate digital analysis (such as pattern recognition, motion analysis, etc.) of the objects in a scene, for example, objects in a sequence of images of a video scene. Plural objects define each image and are typically nebulous collections of pixels, which satisfy some property. These pixels could be the result of some pre-processing operation such as filtering, equalization, edge or feature detection, applied to raw input images. Each object can occupy a region or regions within each image and can change their relative locations throughout subsequent images of the video scene. These objects are considered moving objects, which form motion within a video scene and can be automatically detected and tracked with various techniques, one being template matching.

Template matching is a class of computer algorithms that is used in many digital computer applications, such as image registration, pattern recognition and computer vision applications. A template matching algorithm defines a function (for example, a metric) that estimates the similarity between sets of digital data. In this case, one set of digital data is commonly referred to as a template and another set of digital data is referred to as an image, wherein the template is typically smaller than the image (for instance, the template can be a small portion of the image). In computer vision applications, the template usually represents an object of the image that is being tracked and detected (located) within the image. The object can be located by computing the metric at various locations (u, v) in the image and determining where the metric is maximized.

However, many systems that use template matching are not robust or flexible enough for advanced image registration, pattern recognition and computer vision applications due to unfavorable tradeoffs of functionality for performance (for example, restricting themselves to translations of the template). Therefore, what is needed is a system and method for comparing and matching multiple sets of data by transforming one set of data and performing statistical analyses on the multiples sets of data. Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for statistically comparing a first set of digital data to at least a second set of digital data and matching the first set of digital data to appropriately corresponding portions of the second set of digital data. In one embodiment, the first or the second set of digital data is transformed during statistical analysis to enhance statistical analysis of the digital data.

In one embodiment of the present invention, the system includes a host processor executing software that implements an address generator, an acceptance tester and a statistical comparison processor. The host processor controls the entire process and initially renders or rasterizes the sets of data. The address generator generates addresses, which can reflect a transformation, for the first set of data and the second set of data to be compared. The addresses are used by filtering functions to generate per-pixel values, such as color values. The acceptance tester receives the per-pixel values for performing various conventional pixel tests such as, for example, an alpha test, depth buffer tests, scissor tests, stencil tests, blending, dithering, logical operations, etc., and then determines which pixels are to be used to contribute to the statistical analysis based on the results of one or more of the acceptance tests. The statistical comparison processor statistically analyzes the pixels between the first data set and the second data set for comparison purposes. The host processor then examines the statistical comparisons computed by the statistical comparison processor and makes further processing decisions. The process repeats until a desired result is computed, such as a match or non-match between the data sets.

As is well known to those skilled in the art, conventional graphics processors or graphics rendering devices, including computer graphics cards and the like, are capable of being programmed to perform any number of functions other than simply processing pixels for display on a computer display device. For example, conventional raster graphics implementations typically have a number of buffers with a depth of 16, 32, or more bits per pixel. In general, each pixel can be considered to be a data element upon which the graphics hardware operates. This allows a single graphics language instruction executed by the graphics processor to operate on multiple data elements.

Since the bits associated with each pixel can be allocated to one to four components, a raster image can be interpreted as a scalar or vector valued function defined on a discrete rectangular domain in the x-y plane. For example, the luminance value of a pixel can represent the value of the function while the position of the pixel in the image represents the position in the x-y plane. Alternatively, an RGB or RGBA image can represent a three or four dimensional vector field defined over a subset of the plane. Consequently, highly parallelized calculations can be performed on entire functions or vector fields directly within the graphics hardware of a conventional computer graphics card or the like. Such uses of conventional graphics hardware for performing these types of computations have been well known to those skilled in the art for a number of years.

Therefore, in an alternate embodiment, the system is implemented in a three-dimensional (3D) graphics rasterizer or rendering device, such as, for example, a conventional computer graphics card or processor, which has been modified to include the aforementioned statistical comparison processor. In this embodiment, the system includes a frame buffer (a block of graphics memory that represents the display screen) and texture memory (a block of graphics memory that can contain portions of the display screen), in addition to the components discussed above (i.e., the address generator, the acceptance tester, and the statistical comparison processor).

In one embodiment, the first set of digital data is stored in the frame buffer while the second set of data is stored in the texture memory. Also, statistical generation is performed by the statistical comparison processor included with the modified rasterizer, with or without actually rendering or writing a 3D digital scene comprised of the digital data to the frame buffer. In this embodiment, rasterization and rendering techniques and advanced statistical generation and comparison of the present invention are integrated to form a novel video graphics device or hardware video card for computer systems.

Thus, in one embodiment, the system and method described herein compares and matches a first set of digital data to a second set of digital data. Further, during a raster transformation of the first and second sets of digital data, multiple images of the digital data are placed in texture memory as multiple textures. Then, statistics are gathered concerning the textures, and the raster transformed sets of digital data are compared and matched against corresponding portions of each other. In this context, the system is described as being implemented in a computer system including a host processor and a modified graphics processor including a texture memory for textures, and a graphics processing chip having an address generator, an acceptance tester and a statistics comparison device.

The statistical comparisons and matching processing are provided as part of the rasterization pipeline of the graphics processor, and the data extracted from the processes are then recorded for normalized correlations or variations, and for subsequent forwarding to the host processor or alternate processing system for further processing or storage, as desired. Further, as the data is passed through the rasterization pipeline of the graphics processor, statistics between the textures are gathered and processed via the statistical comparison processor.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIGS. 6A-6C are graphical images illustrating a working example of the present invention.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Exemplary Operating Environment

Figure 1:
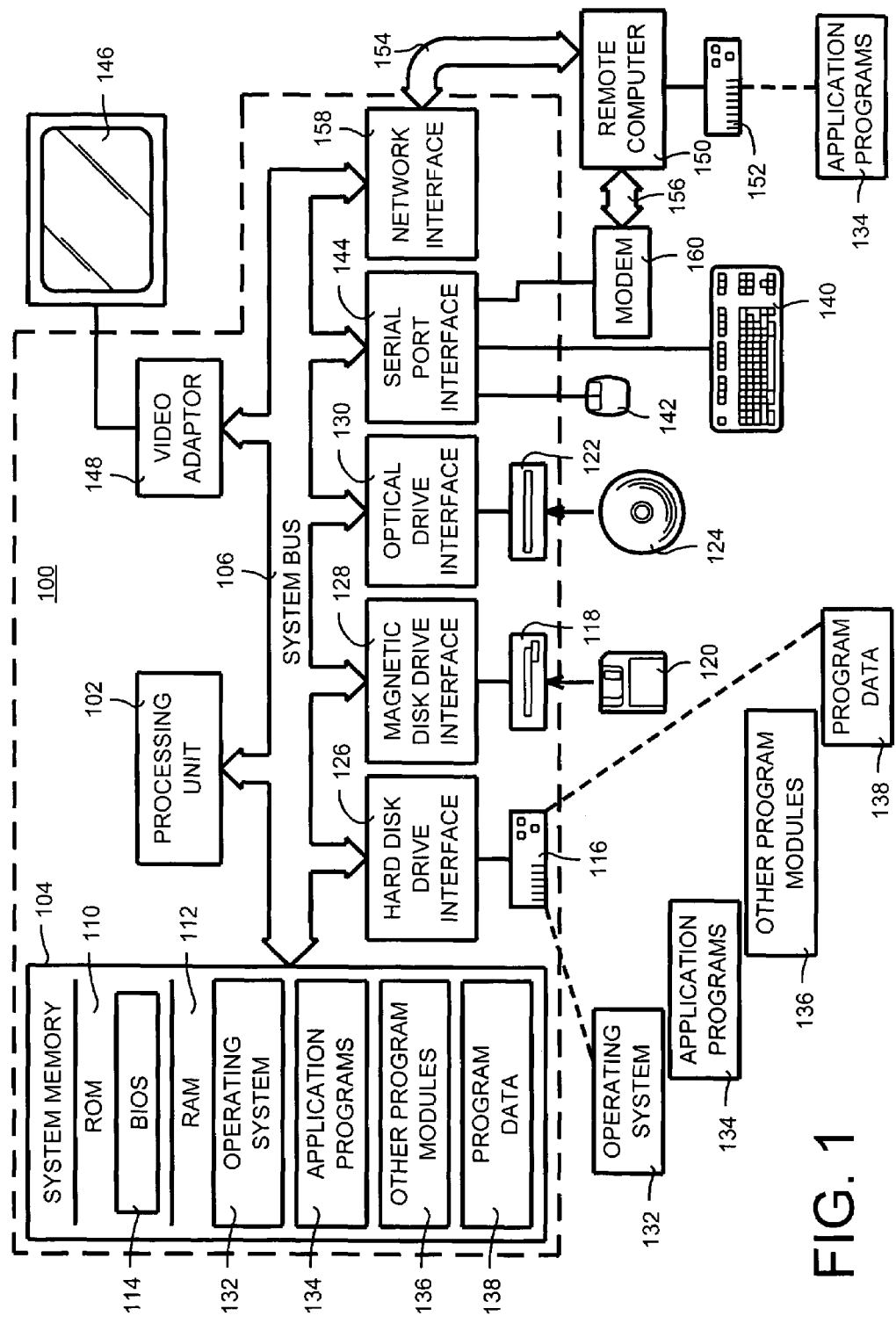
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that help to transfer information between elements within the personal computer 100, such as during start-up, is stored in ROM 110.

The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 118, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used.

II. General Overview

In general, the present invention is embodied in a system and method for statistically analyzing and comparing a first group of pixels of a defined portion of a digital scene, such as an object or template within the digital scene, to a second group of pixels, such as the entire digital scene or the image. The template is matched to appropriately corresponding portions of the image that represent the template. In one embodiment, during statistical comparison and matching of the template and the image, either the first or the second group of pixels is raster transformed. For instance, either the template or the image is incrementally rotated, scaled, or skewed to enhance the statistical analyses.

In particular, first, the system receives digital input, such as the images or the templates. Further, in one embodiment, this data is then pre-processed, using a variety of techniques such as filtering, equalization, and edge or feature finding. The system then computes statistics on either transformed images or transformed templates. Next, the resulting computed statistics are analyzed and new requests based on the resulting statistics are generated with different transformations and/or different images until a desired result is computed, namely a match or non-match between the template and the image.

In one embodiment, the present invention is used as an object detection and tracking system for computer vision, motion analysis and pattern recognition applications, as a video acceleration system for computer graphics video hardware cards, as a video CODEC (coder/decoder), or any other suitable device that utilizes statistical comparison and matching between sets of digital data, such as images. In addition, in one embodiment, the present invention is implemented as computer software running on a computer system, as instruction sets operating within a microprocessor for a hardware device, such as a computer graphics video card, as computer firmware operating within a digital device, such as a digital camera, or any other suitable digital processing system.

As is well known to those skilled in the art, conventional graphics processors or graphics rendering devices, including computer graphics cards and the like, are capable of being programmed to perform any number of functions other than simply processing pixels for display on a computer display device. For example, conventional raster graphics implementations typically have a number of buffers with a depth of 16, 32, or more bits per pixel. In general, each pixel is considered to be a data element upon which the graphics hardware operates. This allows a single graphics language instruction executed by the graphics processor to operate on multiple data elements.

Since the bits associated with each pixel can be allocated to one to four components, a raster image can be interpreted as a scalar or vector valued function defined on a discrete rectangular domain in the x-y plane. For example, the luminance value of a pixel can represent the value of the function while the position of the pixel in the image represents the position in the x-y plane. Alternatively, color (and alpha) values of an RGB (or RGBA) image can represent a three or four dimensional vector field defined over a subset of the plane. Consequently, highly parallelized calculations can be performed on entire functions or vector fields directly within the graphics hardware of a conventional computer graphics card or the like. Such uses of conventional graphics hardware for performing these types of computations have been well known to those skilled in the art for a number of years.

A conventional graphics processor includes a number of functional components including, for example, a frame buffer, texture memory, an address generator, and an "acceptance tester". Note that the term acceptance tester is used here to encompass any of the conventional per-pixel tests which are typically employed by conventional graphics cards, in combination with a determination as to whether particular pixels will contribute to statistical computations.

For example, among the per-pixel tests performed by the acceptance tester in one embodiment is a conventional "alpha test" for checking to see whether a pixel being drawn has a 0 alpha. With conventional graphics cards, a pixel having an alpha value of 0 is simply skipped rather than being drawn. However, in the context of the present invention, since there are two different pixels that are being compared, the comparison is skipped if either pixel has a 0 alpha value. Another conventional per-pixel test performed by the acceptance tester in one embodiment is a "depth buffer" test for determining whether the current pixel being drawn is visible, based on its current z-buffer value. In the context of the present invention, this test is used in one embodiment to only compare a template against the visible portion of a 3D scene. Other conventional per-pixel acceptance tests and operations include scissor tests, stencil tests, blending, dithering, logical operations, etc., as described in "*The OpenGL® Graphics System: A Specification (Version* 1.2.1)," Copyright© 1992-1999 Silicon Graphics, Inc., Apr. 1, 1999, the subject matter of which is incorporated herein by this reference.

In addition, many such graphics processors also include an alpha blending device. Such components are well known to those skilled in the art, and will only be described in general below. However, in one embodiment conventional graphics processors, such as a conventional computer graphics card or the like is modified to include a statistics comparison device for computing statistical information directly from information existing in the rendering pipeline of the graphics processor.

Thus, in one embodiment, the system and method described herein compares and matches a first set of digital data to a second set of digital data. Further, during a raster transformation of the first or second sets of digital data, multiple images of the digital data are placed in texture memory as multiple textures. Then, statistics are gathered concerning the textures, and the raster transformed sets of digital data are compared and matched against corresponding portions of each other. In this context, the system is described as being implemented in a computer system including a host processor and a modified graphics processor including a texture memory for textures, and a graphics processing chip having an address generator, an acceptance tester (for performing conventional per-pixel testing, as described above) and a statistics comparison device."

The statistical comparisons and matching processing are provided as part of the rasterization pipeline of the graphics processor, and the data extracted from the processes are then recorded for normalized correlations or variations, and for subsequent forwarding to the host processor or alternate processing system for further processing or storage, as desired. Further, as the data is passed through the rasterization pipeline of the graphics processor, statistics between the textures are gathered and processed via the statistical comparison processor.

Figure 2:
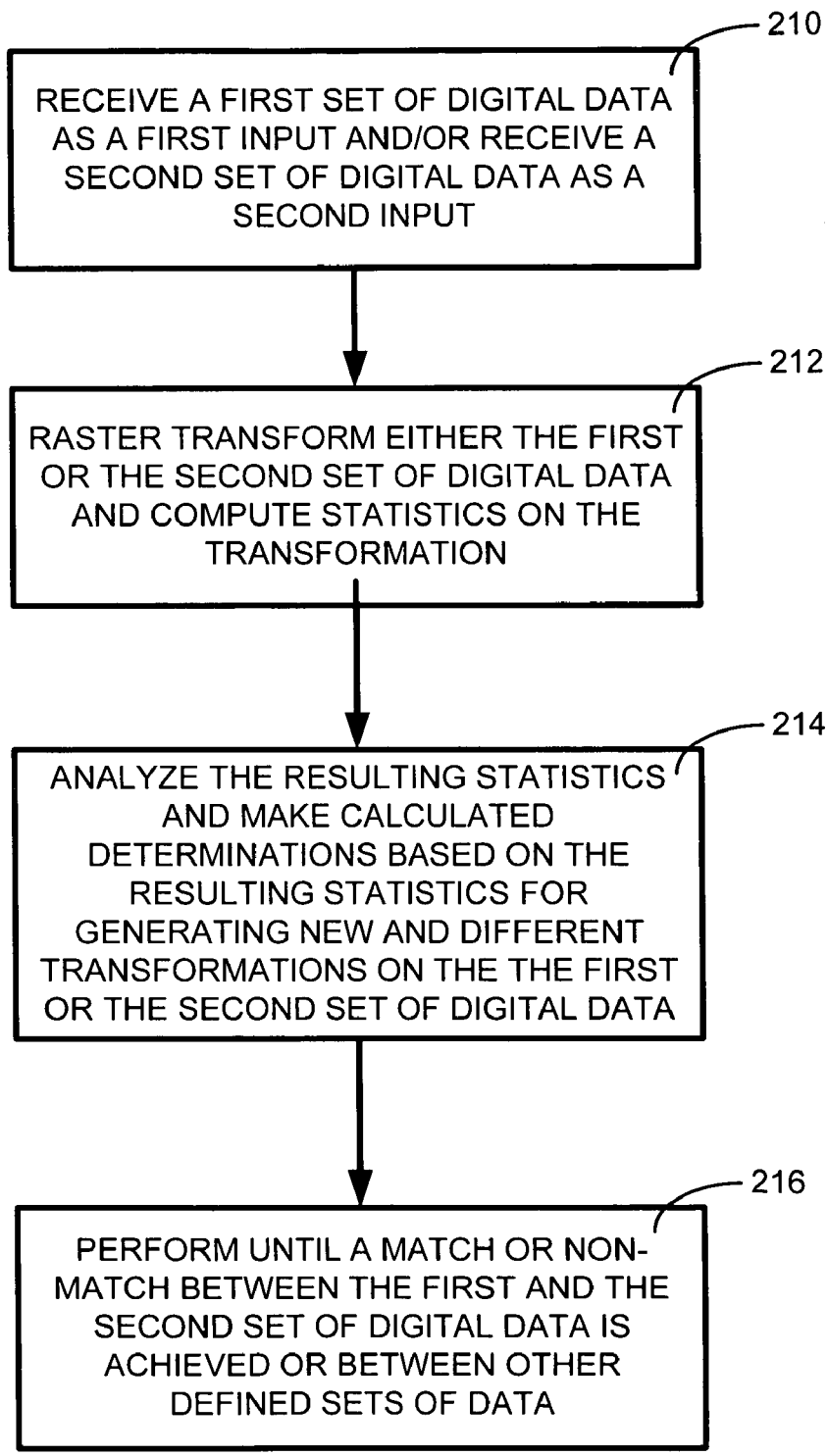
FIG. 2 is an overview flow diagram of the present invention.

FIG. 2 is an overview flow diagram of the system and method of the present invention. In general, the present invention matches a first set of digital data to a second set of digital data by statistically comparing the sets of data. Namely, first the system receives a first set of digital data, such as a template, as a first input, and/or receives a second set of digital data, such as an image, as a second input (step 210). Next, the system 200 raster transforms either the first or the second set of digital data and computes statistics on the transformation (step 212). The system then analyzes the resulting statistics and makes calculated determinations based on the resulting statistics for generating new and different transformations on the data (step 214) until a desired result is achieved, such as a match or non-match between the first and the second set of digital data (step 216) or between other sets of data.

III. Details of Components and Operation

It has been observed that textured triangle rasterization performed in a conventional graphics processor or the like closely resembles sparse matching of a template with an image. In support of this observation, the following discussion will include a brief overview of conventional rendering techniques as known to those skilled in the art. As described herein, these rendering techniques have been adapted for the purpose of template matching. For example, as is well known to those skilled in the art, triangle rasterization performed using conventional graphics processors involves fetching a set of pixels arranged in a regular order in one or more subsets of graphics memory (the source texture maps), combining or operating on these values, and then drawing these into a frame buffer. (See for example, "*The OpenGL® Graphics System: A Specification* (*Version* 1.2.1)," Copyright© 1992-1999 Silicon Graphics, Inc., Apr. 1, 1999). Similarly, sparse template matching involves fetching two regular subsets of graphics memory and then comparing the values to accumulate some statistics. Therefore, the only difference between traditional graphics rasterization (rendering) and sparse template matching is the statistical comparison of pixels and the accumulation of these statistics, as described below. Therefore, an understanding of conventional triangle rasterization will enable those skilled in the art to fully understand sparse matching of a template with an image as described herein.

Figure 3:
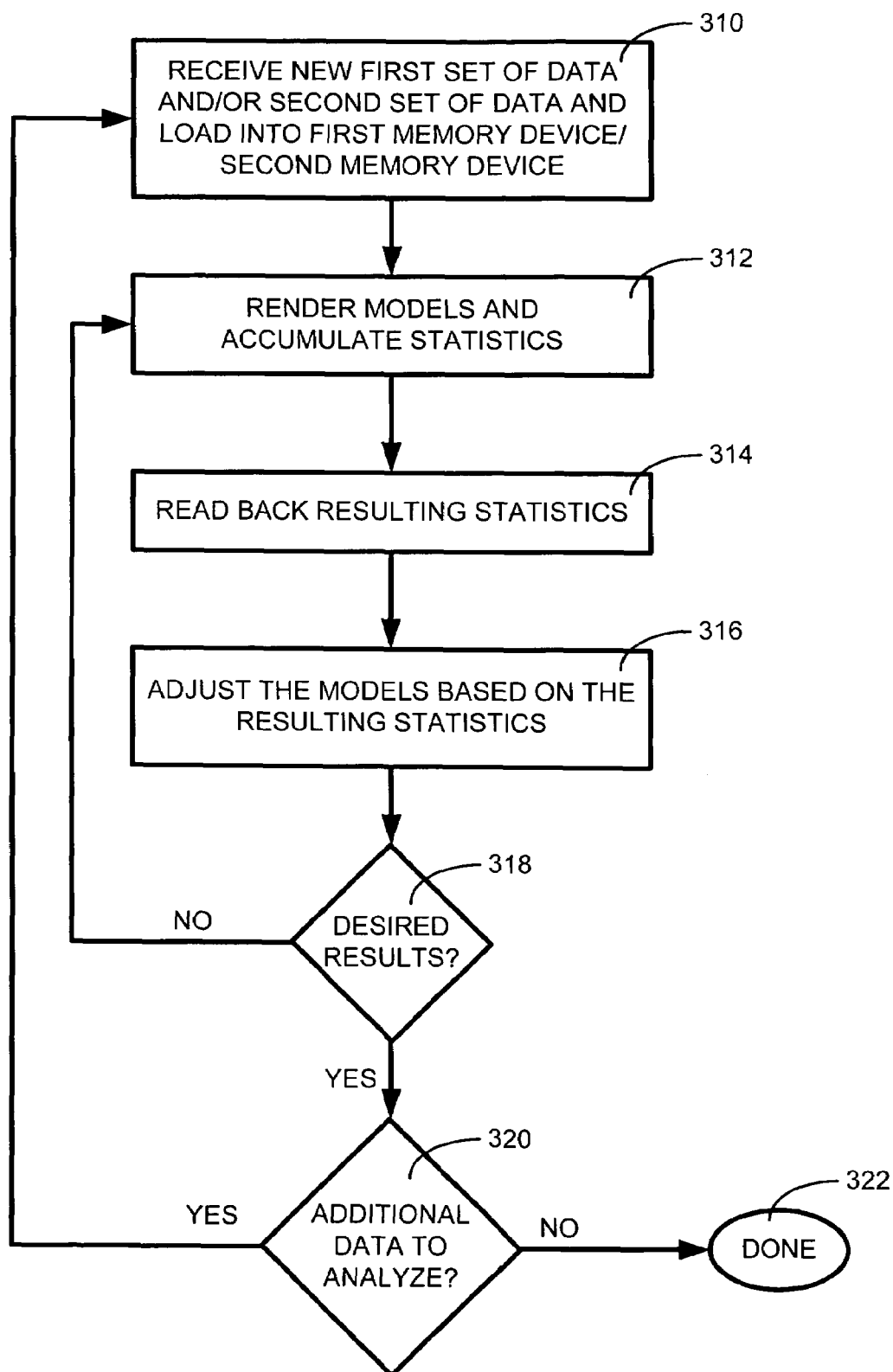
FIG. 3 is a flow diagram of the operation of the present invention.
Figure 4:
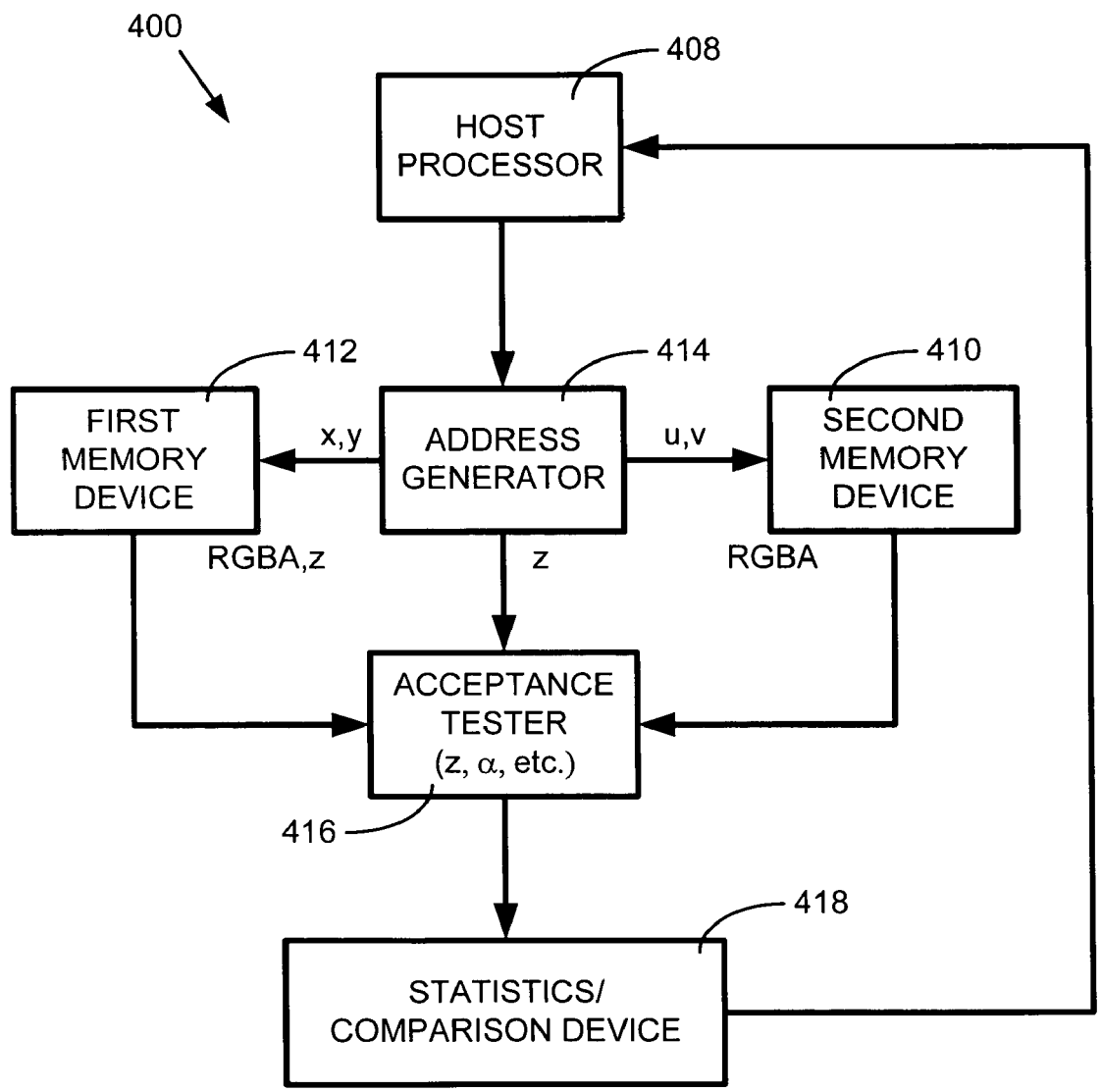
FIG. 4 is a general block diagram of the present invention.

FIG. 3 is a flow diagram of the operation of the present invention and FIG. 4 is a general block diagram of the present invention. Referring to FIG. 3 along with FIGS. 4 and 2, first, new sets of data, such as an image and/or a template is acquired (step 310) by the system 400 and initialized by the host processor 408. In one embodiment, the host processor 408 then stores the new sets of data in the memory devices. For instance, the first set of data, such as the template, is loaded into a first memory device 412 and the second set of data, such as the image is loaded into a second memory device 410. Second, models, such as two-dimensional (2D) or three-dimensional (3D) models, are rendered and statistics are accumulated (step 312) by the host processor 408 for the template and the image. Rendering and statistical accumulation is accomplished using a statistics/comparison device 418 in combination with an address generator 414 and an acceptance tester 416, as discussed in detail below.

Rendering using conventional graphics processors or the like typically involves drawing geometric shapes or primitives, such as polygons, into dedicated memory. It should be noted that the present invention preferably uses triangles as the drawing primitive, although there are other primitive types that could be used. In general, in a simplified example of rasterization provided for purposes of explanation, a single triangle is rendered by taking three vertices $v_0, v_1, v_2$, with the following fields sx, sy, (the screen space coordinates of the triangle in the first memory device) tu, tv, rhw, (the 2D coordinates of each vertex in the texture, and a perspective term). In particular, the address generator 414 of a conventional graphics processor interpolates these parameters ($v_0, v_1, v_2$, etc.) across the triangle; for each pixel in the first memory device subtended by the triangle in screen space (sx, sy), pixel values in second memory device are used by the address generator 414 to compute an interpolated texture value at the corresponding interpolated texture location.

Note that the operations described in the preceding paragraph are equivalent to a conventional resampling operation being applied to the texture, which involves filtering the texture at different locations and at different densities. For example, such resampling operations are described in the context of conventional "texture minification" and "texture magnification" operations in Section 3.8.5 and 3.8.6 of the aforementioned "*The OpenGL® Graphics System: A Specification* (*Version* 1.2.1)," Copyright© 1992-1999 Silicon Graphics, Inc., Apr. 1, 1999.

The present invention builds on these resampling operations by gathering comparison statistics between the RGB color values of the corresponding pixels between the two memory devices 410 and 412, using the statistics/comparison device 418, depending on the results of the acceptance test performed by the acceptance tester 416. For example, as noted above, if the alpha or z-buffer values for particular pixels indicate that those pixels are not visible (e.g., a 0 alpha value), then statistics will not be gathered by the statistics/comparison device 418 for those pixels.

Third, the host processor 408 reads back resulting statistics (step 314) from the statistics/comparison device 418 and adjusts the 2D/3D models based on the resulting statistics (step 316). Steps 312-316 are repeated as long as the desired iterations or quality for matching are not achieved (step 318). When the desired iterations or quality for matching are achieved and if additional images or templates need to be analyzed, steps 310-316 are performed (step 320). However, if no additional images or templates need to be analyzed after the desired iterations or quality for matching are achieved, then the matching or non-matching results are completed (step 322).

In general, the address generator 414 generates addresses for the template and the image that are to be compared. These addresses reflect either the template or image, or a transformation, such as combinations of rotations, scales and perspective transforms, of the template or image. The addresses serve as input to filtering functions that read from the images to be compared and generate color values (RGBA) and, if present, Z buffer and other per-pixel values. When present, these values are used by the acceptance tester 416 to decide whether to allow the pixel to contribute to the statistics. If the pixel is permitted to contribute, the color values are sent to a statistics/comparison device 418 for statistical analyses and comparison processing. For example, as noted above, if the alpha or z-buffer values of a pixel indicate that the pixel would not be visible, then the pixel will not be allowed to contribute to the statistical comparison.

The statistics/comparison device 418 contains variables that are updated for each pixel based on the input color values. For instance, in one embodiment of the present invention, statistical analyses for comparing and matching the sets of digital data is accomplished by initially defining a function or metric within the statistics/comparison device 418 that estimates the similarity between the sets of digital data. In this case, one set of digital data is the template and the other set of digital data is the image. Further, the template can represent an object of the image that is being tracked and detected (located) within the image. The object is then located in the image by computing the metric at various locations (u, v) in the image and determining where the metric is maximized.

In the following examples, T represents the template image and I represents the input image. In one embodiment, the statistics/comparison device 418 uses a cross-correlation coefficient metric for measuring the similarity between the image and the template on an absolute scale in the range [−1, 1], namely:

$$\frac{\text{covariance}(I, T)}{\sigma_I \sigma_T} = \frac{\sum_x \sum_y (T(x, y) - \mu_T)(I(x-u, y-v) - \mu_I)}{\sqrt{\sum_x \sum_y (I(x-u, y-v) - \mu_I)^2 \sum_x \sum_y (T(x, y) - \mu_T)^2}}$$

where $\mu_I$ and $\sigma_I$ designate the mean and standard deviation of the image and $\mu_T$ and $\sigma_T$ designate the mean and standard deviation of the template.

Additional examples of variables and computations that are tracked by the statistics/comparison device 418 in alternate embodiments are illustrated below. For example, to compute the statistic, one or more of the following sums are calculated between the template (T) and corresponding pixels in the image (I) in various embodiments:

1) $\Sigma I$ and $\Sigma T$, the sums of the respective pixel values
2) $\Sigma IT$, the sum of the product of the pixel values
3) $\Sigma I^2$ and $\Sigma T^2$ the sums of the squares of the respective pixel values
4) Pixel Count, the number of pixels that have been accumulated It should be noted that computing these sums may dominate the runtime of the pattern recognition or other high-level algorithm that is using the metric.

Also, one embodiment uses a summing metric for template matching that involves summing some function of the difference between the image and template pixels, for example:

$$f(I, T) = \begin{cases} (I-T)^2, & |I-T| \le \delta \\ |I-T|, & \text{otherwise} \end{cases}$$

where $\delta$ is some value less than 20 (for 8-bit unsigned integer pixel data). A more flexible variation involves computing $\Sigma \text{LUT}(f(I,T))$, the sum of a lookup based on a function of the pixel values. Two examples of $f(I,T)$ are $f(I,T)=I-T$ or $f(I,T)=|I-T|$ (the difference and absolute difference of the pixel values, respectively).

As mentioned above, in one embodiment, a transform is applied to either the input image or the template, in order to find transformed versions of the template object. Typical transformations include combinations of rotations, scales and perspective transforms that are relatively close to identity (to minimize the size of the search space). All of the above-described variations share the characteristic that pixels from the template are iterated over pixels in the image, and a calculation is performed between corresponding pixels. The template is typically small compared to the image and static over a large number of template matching search probes.

In further embodiments, several higher-level search strategies are used to find the best transformation parameters for a given template. For example, one such search strategy involves examining all possible combinations of parameters, e.g., examining the template at all possible positions, orientations, and scales. Further, some computational savings can be obtained by working in a multi-resolution hierarchy, i.e., to match a reduced size template to a reduced size image, and to then try local variations (perturbations) to find a better match.

A search strategy used in another embodiment involves taking derivatives of the matching cost with respect to the unknown parameters, and then using a generalized gradient descent technique. In this case, in addition to summing intensities, (threshold) intensity differences, and intensity products or squares (as in regular, normalized, or robust enhanced cross-correlation), also products of horizontal and vertical derivatives are accumulated with themselves and with the per-pixel difference. If transformations other than translation are being estimated, the number of required derivatives and products rise quickly. However, it is possible to amortize the computation of derivatives that are more complicated and their products by dividing the template up into smaller regions or patches, and only accumulating simpler derivatives and products on a per-pixel basis.

An additional search strategy used in yet another embodiment is to let the unknown transformation parameters (or at least their updates) be controlled by the motion of vertices embedded in the template. For example, the template can be a wireframe mesh of an object that is being tracked. The control mesh is then discretized into finer polygons, such as triangles, and the triangles surrounding each control vertex are used to estimate that vertex's motion. For reasonably textured templates, convergence will occur to the same estimate as the full gradient descent techniques, which explicitly model the interaction between vertices controlling a common patch or triangle.

In addition, the alpha values, α, of the RGBA (red, green, blue, alpha) values in the input colors are used in one embodiment to weight the statistics, where α is a number between 0 and 1. For example, if $\alpha_T$ is the template alpha and $\alpha_I$ the image alpha, then a new α is derived from these values by either selecting one, or by performing a conventional weighted blend between them. In one embodiment, the resulting α is then used to weight the pixel's contribution to the above-described statistics. Among other things, this allows pixels to be importance-weighted by the application.

V. Working Example

Figure 5:
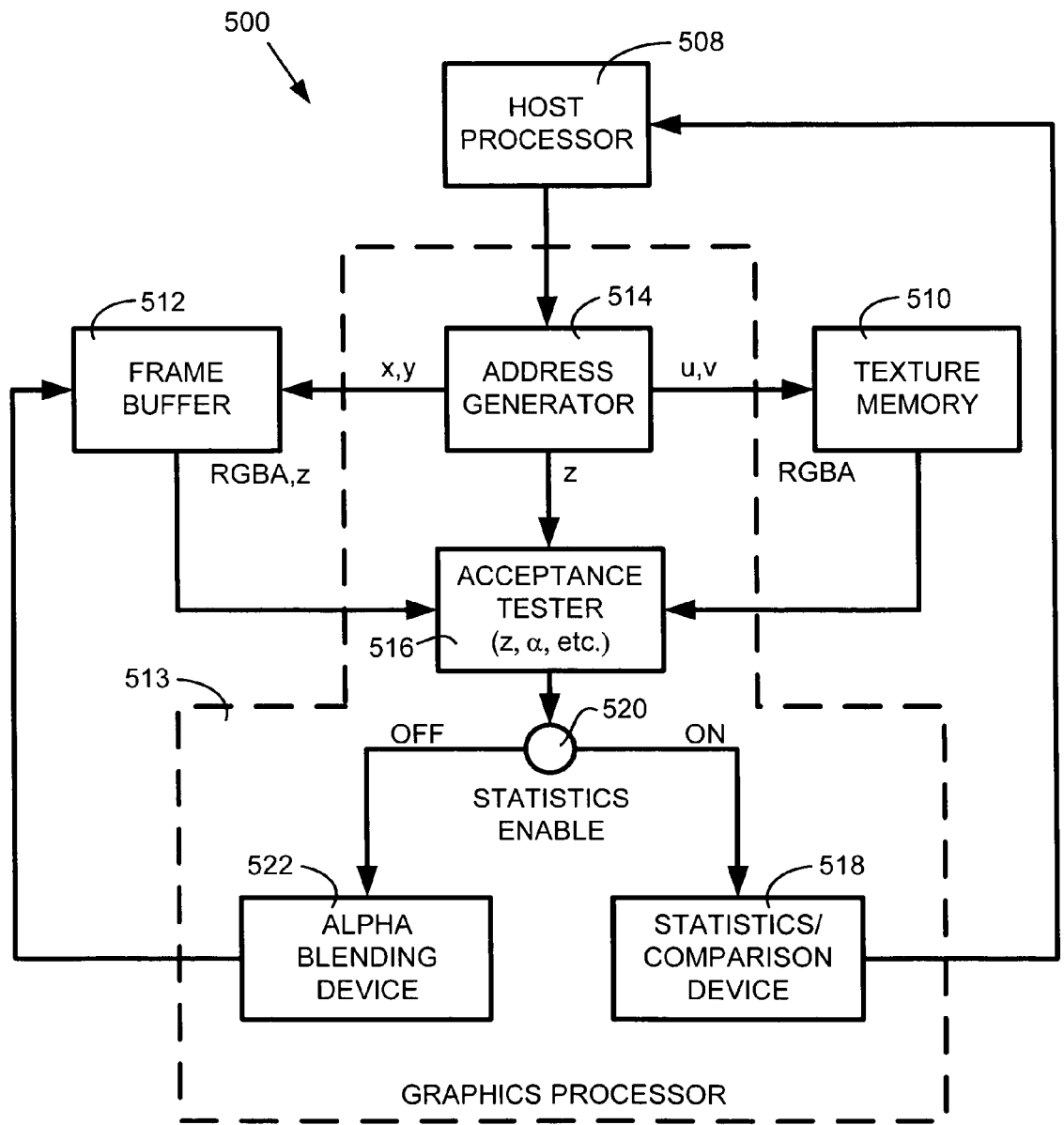
FIG. 5 is a block diagram illustrating one embodiment of the present invention.

The following working example is for illustrative purposes only. FIG. 5 is a block diagram illustrating one embodiment of the present invention. In general, similar to FIG. 4, the example system 500 of FIG. 5 includes a host processor 508, a first memory device 512, such as a frame buffer, a second memory device 510, such as a texture memory device, and a graphics processor 513 such as a modified computer video or graphics card that includes an address generator 514, an acceptance tester 516 and a statistics/comparison processor 518. In this example, the frame buffer 512 is a block of graphics memory that represents a display for a computer screen and texture memory 510 is a block of graphics memory that may contain portions of the display screen. In addition, the example system 500 of FIG. 5 also includes a statistics enable switch 520 and an alpha blending device 522. In this example, the graphics processor 513 resamples either the first or the second set of data to be matched to each other using a conventional perspective transformation. Note that such perspective transforms are well known to those skilled in the art, and are described in Section 2.10 of "*The OpenGL® Graphics System: A Specification (Version* 1.2.1)," Copyright© 1992-1999 Silicon Graphics, Inc., Apr. 1, 1999.

In one embodiment, this example system provides a three-dimensional (3D) graphics rasterizer that is modified as described above to form a novel video graphics device or hardware video card for computer systems. In this embodiment, the first set of digital data is stored in the texture memory while the second set of data is stored in the frame buffer. Also, statistical generation is performed by the statistics/comparison device 518 with or without actually rendering or writing a 3D digital scene to the frame buffer by routing the data to the statistics/comparison device via the statistics enable switch 520. Therefore, for implementing this system using a computer video graphics hardware device, the additional core logic represented by the statistics/comparison device 518 and the statistics enable switch 520 is used to compute the statistics and to forward the results back to the host processor 508 upon request. FIG. 5 shows computations of the statistics between the texture map and the frame buffer image for tracking statistics on the two input pixel values instead of blending between them (via the alpha blending device 522) and writing the result to the frame buffer 512.

Namely, when the statistics enable switch 520 is enabled, the graphics processor 513 renders the rasterized information (step 220 of FIG. 2) without writing the results to the frame buffer 512. In contrast, when the statistics enable switch 520 is disabled, the graphics processor 513 actually renders or writes the rasterized information to the frame buffer and display screen. Conventionally, the alpha blending device 522 allows use of an additional (such as a fourth) color component that is not displayed, but that corresponds to the opacity of a surface. This provides control of the amount of color of a pixel in the source surface to be blended with a pixel in the destination surface. However, as noted above, in the context of the present invention, alpha values associated with pixels are instead used for weighting computed statistics. Consequently, when the statistics enable switch 520 is enabled, the statistics/comparison device 518 uses conventional weighting methods for weighting the statistics relative to the alpha values associated with the pixels.

In one specific embodiment of the example of FIG. 5, the template is treated as a texture and the frame buffer an image and the display primitive for rendering purposes is a triangular polygon. In addition, instead of rasterizing the texture into the frame buffer, certain statistics are recorded for normalized correlation or other statistics can be recorded for various embodiments. In one example, if the texture is considered a template and the frame buffer an image, the graphics processor 513 is used to resample the template using a perspective transformation. Also, the statistics/comparison device 518 of the modified graphics processor 513 is used to record statistics ($\Sigma T, \Sigma I, \Sigma IT, \Sigma T^2, \Sigma I^2$ for normalized correlation, or other statistics for a variation) for later forwarding to the host processor.

The example system 500 is extremely flexible because it has the ability to intersperse rendering/accumulation commands with accumulator readback commands. For example, if a deformable triangular patch is being tracked, the triangle can be rendered using a number of smaller triangles (such as 16), and the accumulator can read back after each of the small triangles has been rendered. This allows host processor 508 to compute necessary derivatives and sums to compute a full affine motion for the triangle. Similarly, if a larger template, potentially consisting of a number of triangles, is being tracked, each triangle's accumulated values are read back in order to compute an independent motion of each control vertex for the template. It has been observed that the number of readbacks per rendered model are few enough that they should not impose a large burden on a hardware graphics port of a computer system, such as the exemplary computer system depicted in FIG. 1.

Note that either the first or the second set of data to be compared with each other can be rendered at a number of offsets. This allows the host processor 508 to either explicitly find the best position for the first set of data, such as the template, or accumulate the required information to analytically compute the best update. The offsets are preferably simple integer or fractional (such as ½ pixel) perturbations to the vertices. As such, it is preferable that the system 500 supports differencing of the deformed data (such as the template) and the target data (such as the image) at a number of pixel or sub-pixel shifts. For example, in one embodiment, the host processor 508 specifies the shift amount (for instance d=1 or d=½ pixel), to enable accumulation differences not only with the target data, but also with versions shifted by ±d pixels horizontally and vertically (accumulating 9 times the statistics). For software implementations, the speed/memory-hardware tradeoff is good, where the cost of rasterizing a single pixel is still several cycles.

Another advantage of integrating the rasterization and matching stages (via the statistics/comparison device 518) is that the graphics hardware is then capable of performing the visibility computation for 3D model-based tracking. The 3D model would be rendered once in order to compute the z-buffer, and then it would be rendered again to compute the (per-triangle) statistics. Note that rendered pixels which fail the z-buffer test (i.e., the depth buffer test) would be discarded from the computation, since they are not visible.

FIGS. 6A-6C are graphical images illustrating a working example of the present invention. FIG. 6A shows an image 600 from which a feature of interest 610 is to be extracted. FIG. 6B shows the feature of interest 610 as a template 615 extracted from FIG. 6A. The feature 610 is the portion of the image 600 that is to be tracked or located in subsequent input images. FIG. 6C shows a subsequent input image 630 that contains a rotated and scaled version of the feature 610. The system of the present invention detects the feature 610 by transforming either the template 615 or the image 630 (in this case, the template 615 is transformed) and gathering statistics between the transformed template 615 and the input image 630. A suitable rasterizer in accordance with the present invention, as described above, is used to transform the template 615.

Display primitives, in this case triangles, are used to transform the template 615 and locate it in the input image 630. For instance, the mapping of the triangles from template 615 to image 630 is shown by arrows 640, 645. Also, although two display primitives encompass the entire template 615 for rasterizing the template 615, additional primitives can be used for rasterizing and they do not necessarily have to encompass the entire template 615. Further, any suitable transform can be used. For example, powerful transforms, such as perspective transforms, can be applied to the template, as well as the affine transform depicted in FIG. 6C.

The foregoing description of the invention has been presented for the purposes of illustration and description. It is not intended to be exhaustive or to limit the invention to the precise form disclosed. Many modifications and variations are possible in light of the above teaching. For example, any pre-processing transformation, such as filtering, equalization, or edge or feature finding, could be applied to the images before they are input to the system and method of the present invention. Thus, it is intended that the scope of the invention be limited not by this detailed description, but rather by the claims appended hereto.

What is claimed is:

1. A method for comparing and matching a first set of digital data to at least a second set of digital data, comprising:
    using a computer graphics card for raster transforming at least one of the first set of digital data and the second set of digital data said raster transformations including combinations of rotations, scales, perspective transforms, and translations;
    depending upon the results of a pixel acceptance test performed by an acceptance tester included in the computer graphics card, performing a statistical comparison between at least part of the first set of digital data and at least part of the second set of digital data using a statistical processor included in the computer graphics card;
    wherein the statistical processor uses pixel alpha values to weight any of the first set of digital data and at the second set of digital data; and
    wherein the statistical comparison includes statistically comparing and matching the alpha weighted and raster transformed sets of digital data to appropriately corresponding portions of each other using the statistical processor.

2. The method of claim 1, further comprising using the statistical processor for analyzing the statistical comparisons and using the computer graphics card for generating new transformations for matching the sets of data.

3. The method of claim 1, further comprising using the statistical processor for statistically comparing the raster transformed sets of digital data until a match or non-match between the first and second sets of data is achieved.

4. The method of claim 1, wherein the raster transforming comprises raster transforming at least one of the first or the second set of digital data and computing statistics on the transformation.

5. The method of claim 4, wherein statistically comparing and matching comprises analyzing the computed statistics of the transformation and calculating new and different transformations on the digital data.

6. A method for comparing and matching a first set of digital data to at least a second set of digital data, comprising:
    loading at least one of the first and second sets of digital data into a first memory device;
    using a 3D graphics rendering device for rendering model transformations and accumulating statistics of the loaded digital data, said 3D graphics rendering device modified to include a statistical processor, and said model transformations including combinations of rotations, scales, perspective transforms, and translations;
    weighting the accumulated statistics using pixel alpha values associated with any of the first and second sets of digital data;
    adjusting the model transformations based on the weighted accumulated statistics; and
    statistically comparing and matching the model transformations of the loaded set of digital data to appropriately corresponding portions of the other set of digital data.

7. The method of claim 6, further comprising statistically comparing the sets of digital data until a match or non-match between the first and second sets of data is achieved.

8. The method of claim 6, wherein adjusting the model transformations comprises analyzing the statistical comparisons and generating new transformations for matching the sets of data.

* * * * *